United States Patent

Sherman et al.

[11] 3,893,729
[45] July 8, 1975

[54] CONVERTIBLE PASSENGER SEAT

[75] Inventors: Gale K. Sherman, Tustin; Guy A. Smith, Newport Beach, both of Calif.

[73] Assignee: McDonnell Douglas Corporation, Santa Monica, Calif.

[22] Filed: Nov. 18, 1974

[21] Appl. No.: 524,385

[52] U.S. Cl. ............... 297/118; 297/130; 297/232; 297/115; 248/188.1; 296/64
[51] Int. Cl.² ........................................ A47C 13/00
[58] Field of Search .......... 297/118, 130, 232, 107, 297/115, 248, 344, 346; 248/188.1, 424, 248/429; 296/64; 280/202; 108/137, 108/153, 157

[56] References Cited
UNITED STATES PATENTS

| | | | |
|---|---|---|---|
| 1,802,620 | 4/1931 | Scully | 297/115 X |
| 3,024,066 | 3/1962 | Anderson et al. | 297/248 |
| 3,236,484 | 2/1966 | Hozeski | 297/248 X |
| 3,637,253 | 1/1972 | Maule | 297/115 X |
| 3,743,351 | 7/1973 | Harris | 297/118 X |
| 3,785,600 | 1/1974 | Padovano | 248/188.1 |

Primary Examiner—Roy D. Frazier
Assistant Examiner—Peter A. Aschenbrenner
Attorney, Agent, or Firm—Robert O. Richardson; Walter J. Jason; Donald L. Royer

[57] ABSTRACT

Aircraft passenger seats are made variable in width to allow for either coach or first class accommodations. The width of the seat bottoms is varied by means of telescoping tubes or equivalent structural members used for cross beams. When the seat bottoms are extended, a short segment of cushion is added, an armrest cap folds open, and a center table is plugged into bayonet sockets in the armrest. No change is made in the seat backs.

8 Claims, 8 Drawing Figures

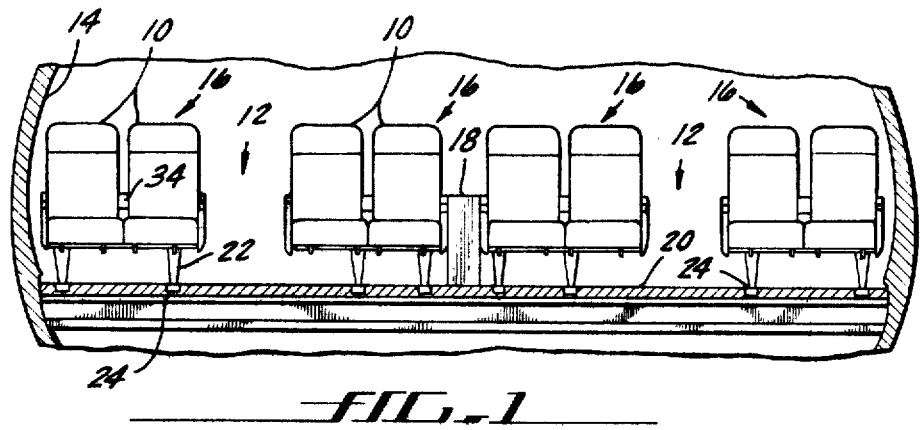
FIG_1
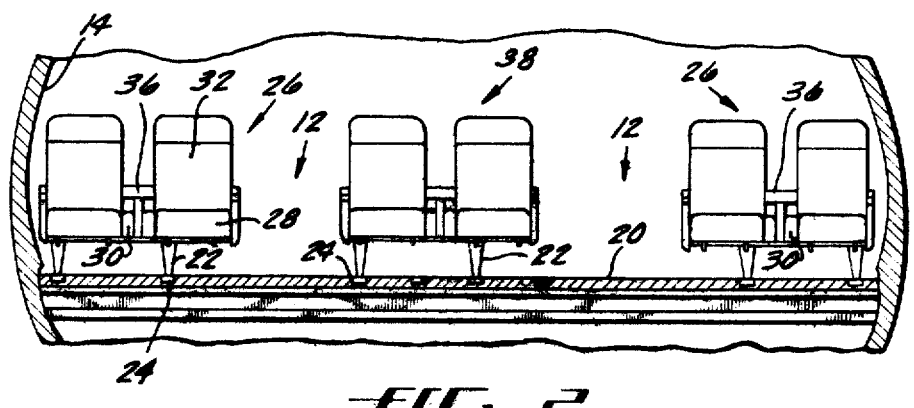
FIG_2
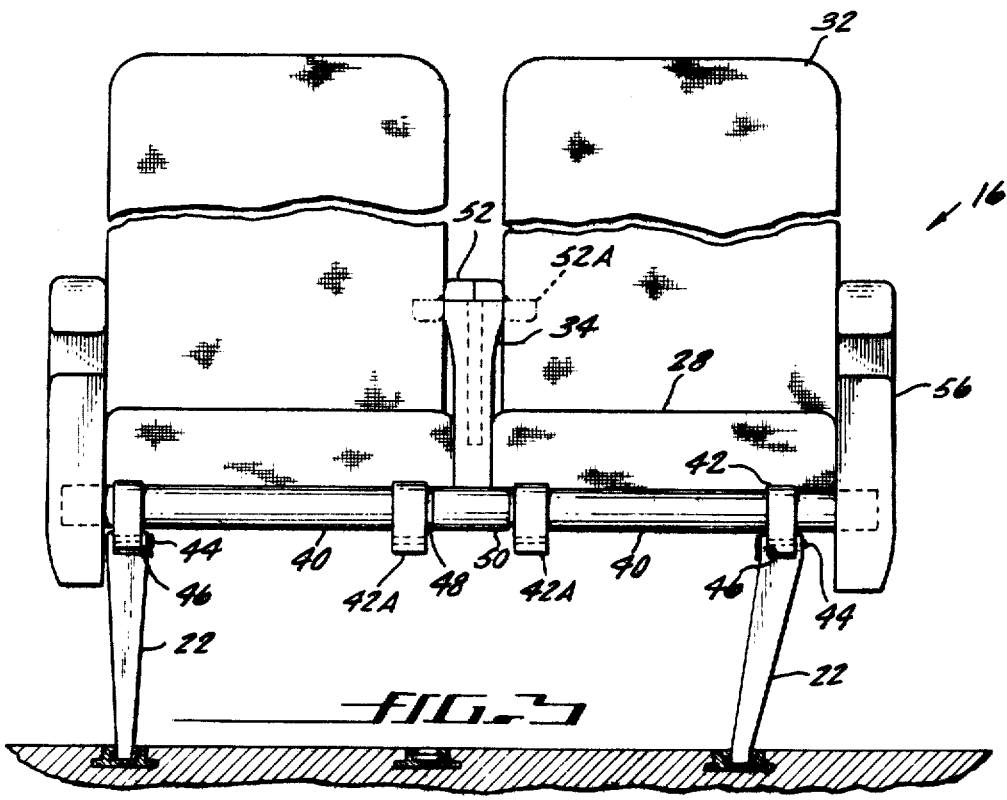
FIG_3

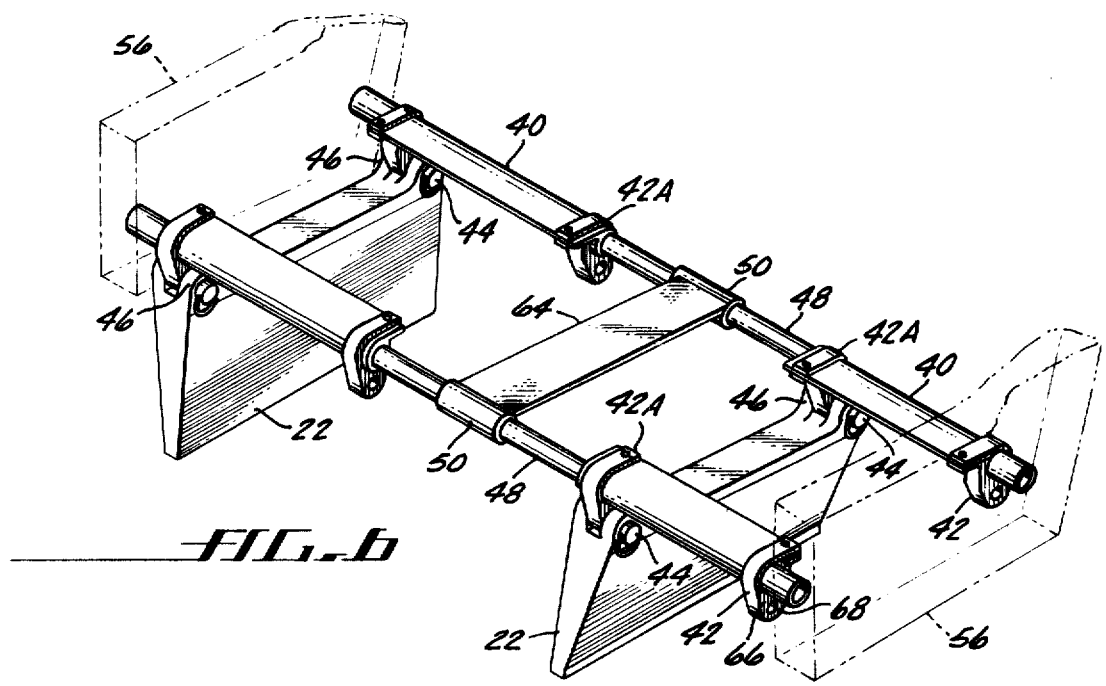
FIG.6
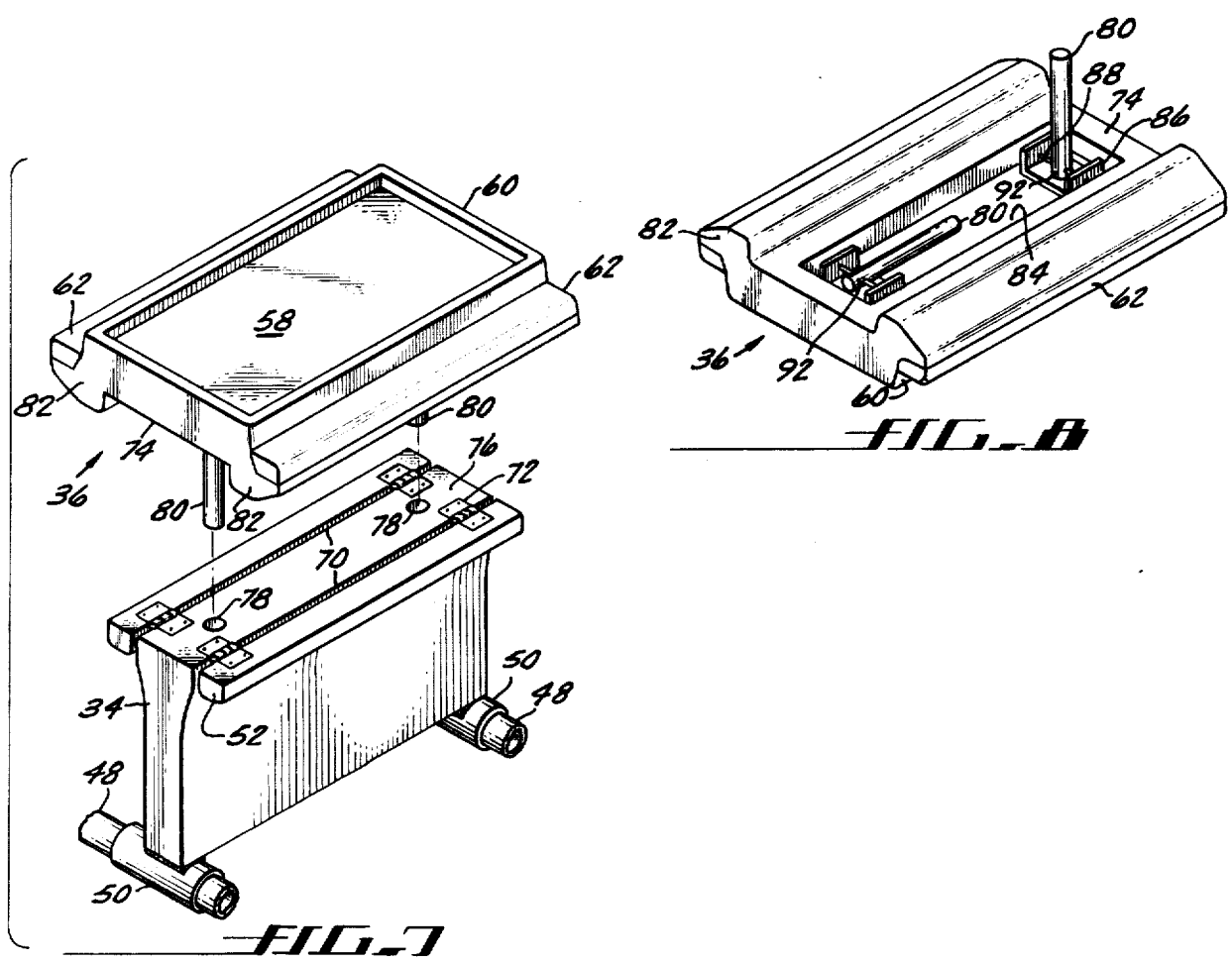
FIG.7
FIG.8

CONVERTIBLE PASSENGER SEAT

BACKGROUND OF THE PRESENT INVENTION

It is customary in passenger aircraft to provide passenger seats of different width in coach and first class sections. In first class sections where comfort and service is stressed, the seats are wider, on the order of 57 inches for a unit of two seats. In coach sections a unit of two seats is 44 inches wide. In wide-bodied jet aircraft with two aisles, there are six first class seats in a row or eight coach seats, the latter representing a 25 percent increase in seating capacity. A problem faces the operator of an airline in that the demand between coach and first class seating continually varies. Holders of first class tickets are entitled to first class accommodations, yet conversions to coach to accommodate a sudden large demand for coach seats also must be made with a minimum of delay and inconvenience.

U.S. Pat. No. 3,374,032 for Aircraft Seat issued Mar. 19, 1968 to Frank J. Del Giudice which discloses a unit of three seats. When the middle seat is unoccupied, its headrest pivots down to form an armrest and seat divider, giving the appearance of more room. The foldable armrests fold up into the seat backs to increase their widths somewhat. However, this is not acceptable as a first class seat, the bottom of which actually must be wider.

U.S. Pat. No. 3,145,052 for Airplane Seats issued Aug. 18, 1964 to Robert C. Morgan. This patent discloses a unit of three seats having a unitary seat bottom. The center back is split and has slide bolts which operate to divide the back section into two wide backs or three more narrow backs. The two armrests dividing the unit into three seats may be moved together in the center and a table placed over them to provide two wide seat bottoms. However, while this teaches a conversion between three smaller and two larger seats, it does not solve the problem of making two seats larger.

There are many ways of laterally extending chairs to convert them into beds. U.S. Pat. No. 954,594 issuing Apr. 12, 1910 to Alvoni G. Shaw for Convertible Chair, U.S. Pat. No. 1,530,420 issuing Mar. 17, 1925 for Convertible Chair, and U.S. Pat. No. 2,242,617 issuing May 20, 1941 for Laterally Extending Chair or Seat are but examples. However, the legs extend laterally with the extensible frame and usually the back drops down to complete the conversion to a bed. None of these solve the problems solved by the present invention.

SUMMARY OF THE PRESENT INVENTION

In accordance with the present invention a two-passenger seat unit has a pair of support frames mounted in trackways on the floor of an aircraft. The width of the seats is varied to allow for either coach or first class accommodations. This is done by means of telescoping tubes or equivalent structural members used for cross beams. A conventional narrow center armrest separates the two seats. However, in this case the padded armrest cap is split and hinged. When the seat is extended, a short segment of cushion is added, the center armrest cap folds open, revealing two bayonet-type sockets. A center table is plugged into these bayonet sockets in the armrest. The bayonet legs on the center table fold flat to the underside of the table when not in use.

The ability to enlarge or decrease the size of first class or coach accommodations by converting seats rather than exchanging them is a great asset to airlines. Eliminating the need to procure both types of seats initially and as spares provide economic advantages for them.

BRIEF DESCRIPTION OF THE DRAWINGS

FIG. 1 is an elevational view showing a row of eight coach seats;

FIG. 2 is an elevational view showing a row of six first class seats;

FIG. 3 is a front elevational view of a two-seat unit in coach seat configuration;

FIG. 6 is a view similar to FIG. 5 but with the seat bottom and back removed to show the lower seat unit framework;

FIG. 7 is an exploded isometric view of the armrest and table; and

FIG. 8 is an isometric view of the table showing its underside.

DETAILED DESCRIPTION OF ILLUSTRATIVE EMBODIMENT

Figure 4:
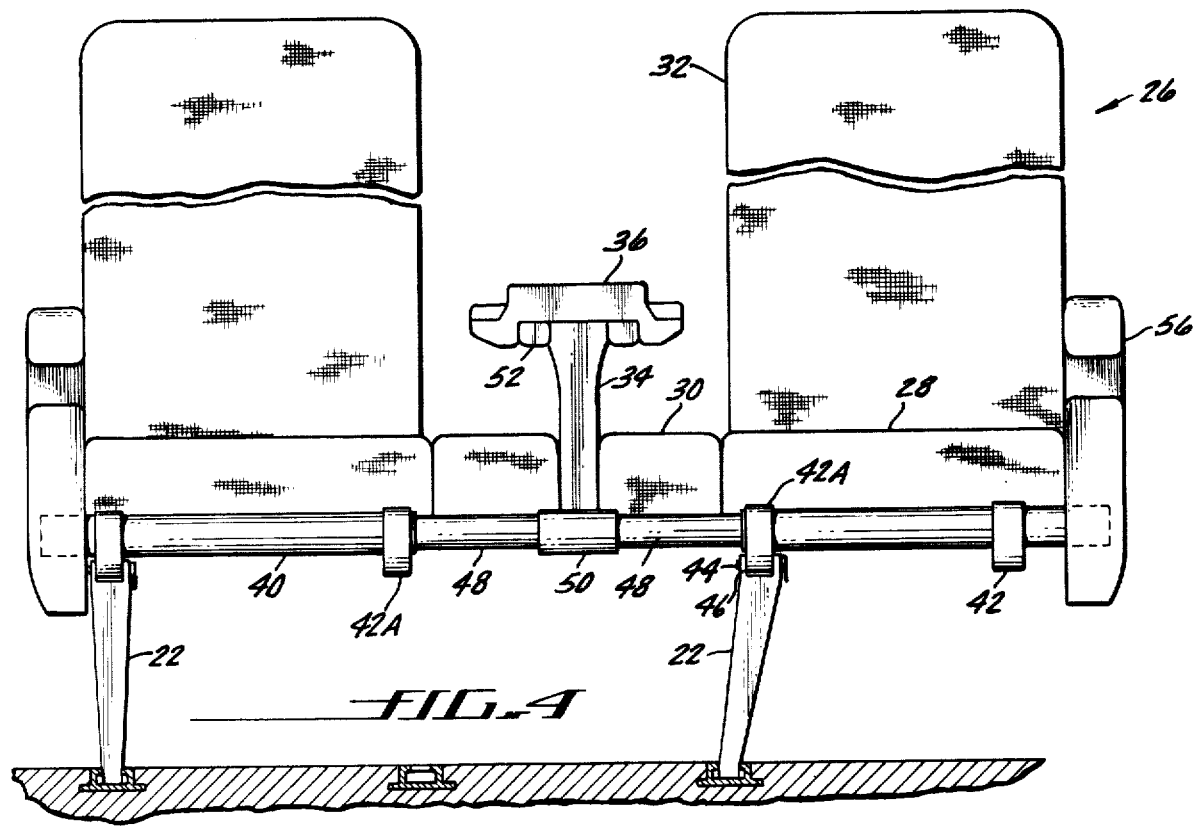
FIG. 4 is a front elevational view of a two-seat unit in first class configuration.

Reference is made to FIG. 1 showing an elevational view of eight coach seats 10 and two aisles 12 spaced across the cabin 14 of an aircraft. These seats consist of four two-seat units 16 and each seat is "no more than one seat away from the aisle," as one of the major airlines is quick to point out. Each unit is on the order of 44 inches wide, with each seat of 22-inch width being comparable in width to that of an executive office chair. a table 18 is positioned between the two units positioned between the aisles 12.

Each seat unit is secured to the floor 20 by a pair of seat supports 22 attached at their lower end to tracks 24 in the floor in a conventional manner. These seats supports typically have front and back legs connected together at the top and bottom to form an integral unit. One such seat support is more clearly set forth in U.S. Pat. No. 3,460,791 issuing Aug. 12, 1969 to Ronald I. Judd for Fail Safe Seat Support Frame assigned to the present assignee.

It can be seen that the supports 22 on the seat units between the aisles 12 and the cabin wall are wider than the supports supporting the units between the aisles. However, it should be noted that the spacing between alternate tracks between the aisles 12 is the same as the spacing between the support tracks between the aisles and the cabin walls.

FIG. 2 shows a row of six-abreast first class seats with two aisles. Each outer two-seat unit 26 is wider than its counterpart in the coach configuration in FIG. 1 yet the seat supports 22 remain in the same tracks 24 as before. The seat bottoms 28 for each seat are wider since a short segment 30 of seat cushion has been added. The seat backs 32 are not any wider, although they are spaced farther apart. The divider armrest 34 in FIG. 1 is transformed into a divider table 36 in FIG. 2. Structure for permitting this conversion will be described hereinafter.

Between aisles 12 in FIG. 2 it can be seen that table 18 and one coach two-seat unit 16 in FIG. 1 have been removed and the other coach two-seat unit 16 has been converted into a first class two-seat unit 38. The leg supports 22 have been moved to extend from alternate tracks 24. For convenience in reconverting back to the coach configuration at a later time, the extra seat unit 16 and table 18 may be stored in an aircraft cargo compartment.

Each of the first class seat units is on the order of 57 inches wide, with each seat being about 6½ inches wider, and roomier, than its coach counterpart. Also when converting from eight-abreast coach to six-abreast first class configuration, each aisle 12 is widened another 5 inches.

FIGS. 3 and 4 are front views of a coach seat unit 16 and first class seat unit 26, respectively. Here is shown support sections 22 attached to telescopic members 40 by means of brackets 42 which are secured to the members 40. Removable pins 44 interconnect the brackets 42 to spaced ears 46 at the top of support sections 22. Telescopic members 40 slide over central tubular member 48 for elongation purposes. The inner end of one of telescopic members 40 has a second bracket 42A which is used when the seat unit is extended, as shown in FIG. 4.

Divider armrest 34 has a mounting bracket 50 in the form of a tubular sleeve mounted on central tubular member 48. This armrest has a divided top padded portion 52 which folds open to the position shown by dashed lines 52A to support a table 36 as shown in FIG. 4. Openings 54 in armrest 34 are provided to receive legs on the bottom of the table to hold it in place.

The conversion of the coach seat unit 16 in FIG. 3 to the first class seat unit shown in FIG. 4 is accomplished by first pulling pins 44 on the seat support 22 shown on the right, lifting the right end and armrest 56 to which is fastened the telescopic members 40 on the right. This frees brackets 42 from ears 46 of seat support 22 and permits extension of the seat until brackets 42A mate with ears 46. Pins 44 may then be inserted to secure the seat unit in extended position.

After the seat unit has been extended, short segments of cushions 30 are added to seat bottoms 28 to provide for greater seating area. Seat backs 32 are of the same width as before but are now spaced farther apart. The table 36 may be added either before or after the seat unit is extended.

Figure 5:
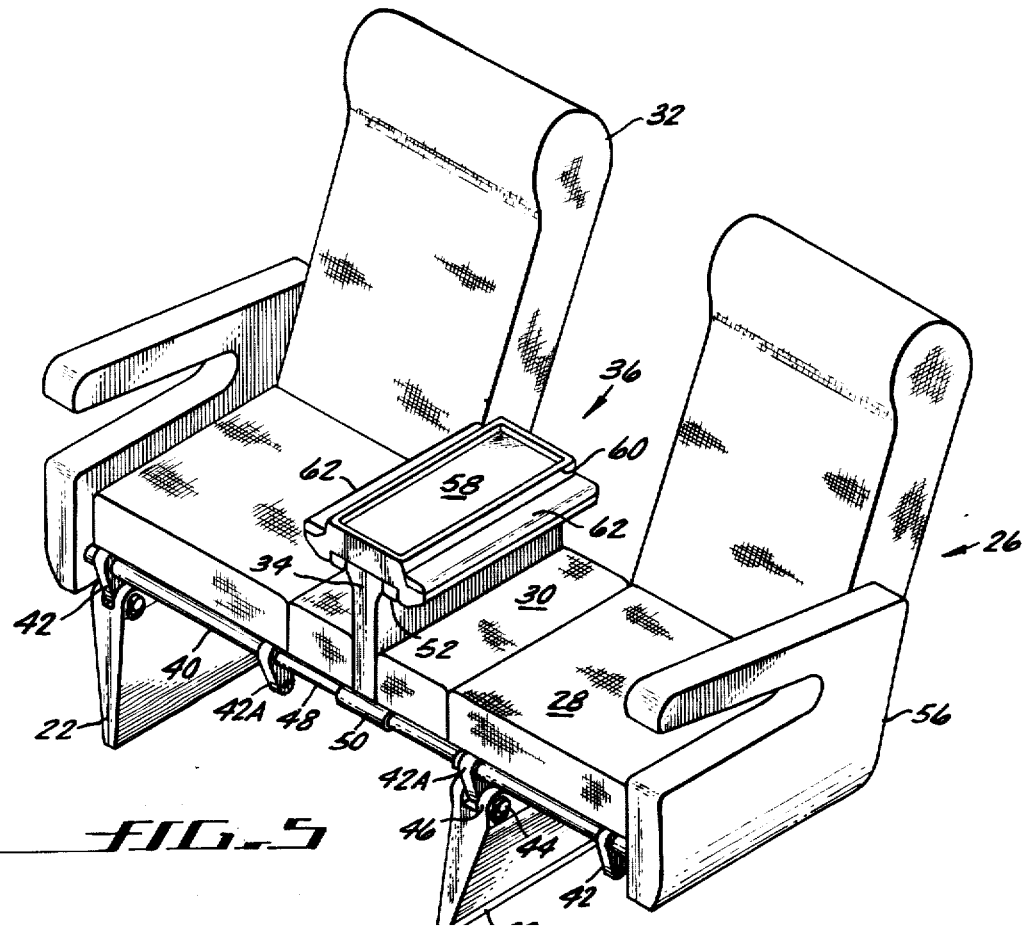
FIG. 5 is an isometric view of the two-seat unit in first class configuration.

In FIG. 5 is shown a pictorial representation of the two-seat unit 26 in extended configuration. Here the table 36 is positioned over the armrest padded portion 52 which has been folded out to support the table and to expose openings in the armrest to receive the table legs, as will be explained hereinafter. Table 36 includes a top portion 58 with raised edges 60 and laterally spaced armrest pads 62. Cushion segments 30 have been placed between seat bottoms 28 and the armrest 34. As shown, the right seat end and armrest 56 have been moved to the right so that the inner bracket 42A is secured to seat support 22. However, another inner bracket 42A is on the inner end of the telescopic member 40 on the left so that the seat could have been extended to the left, if desired. In the event one seat is unoccupied, armrest 34 can be removed and the two seats may be used as a short bed or lounge, if desired.

In FIG. 6 the seat backs and bottoms have been removed in order that the lower framework can be seen more clearly. Armrest support 64 with mounting brackets 50 at each end hold front and back central tubular members 48 in spaced parallel relationship, forming an I configuration. The parallel spaced telescopic members 40 are fastened at their outer ends to seat ends and armrests 56, forming a U configuration. Hence a pair of U-shaped structural configurations telescopically engage the legs of the I-shaped structural configuration. Brackets 42 and 42A have fastening lugs 66 adapted to fit between ears 46 on seat supports 22. Each lug has an aperture 68 to permit the insertion of a locking pin 44 therethrough. The brackets may be inserted over telescopic members 40 and clamped onto them or welded to them, if desired.

In FIG. 7 there is shown in exploded view the armrest 34 and table 36 which fits over it. Armrest 34 extends between the front and back laterally extending central tubular members 48 and has front and rear mounting brackets 50 attached to its bottom surface. This eliminates the need for armrest support 64 shown in FIG. 6 or, in the alternative, the armrest 34 may be attached to support 64 instead of to the brackets 50, if desired. At the top of the armrest and along each longitudinal edge 70 is a padded portion 52 connected thereto by means of spring-loaded hinges 72. These hinges permit opening and folding down of the padded portions 52 to the open position shown to support the lower surface 74 of table 36. The top surface 76 of armrest 34 has a pair of openings 78 therein to receive legs 80 which extend downwardly from the table. Spaced armrest pads 62 rest on laterally extending members 82 which project outwardly on table 36. The table preferably is a one-piece integral molded plastic material to which the legs and armrest pads are attached.

The underside of table 36 is shown in FIG. 8 where the lower surface 74 has a recessed portion 84 in which leg mounting brackets 86 are positioned. These brackets are U-shaped with pins 88 extending across the bracket legs 90. Table legs 80 are mounted on pins 88 and are adapted to fold into the recessed portion 84 for storage when the table is not in use. The end 92 has a flat surface which abuts the cross portion 94 of U-shaped bracket 86 when leg 80 is extended to improve the rigidity of the mounting. Pin 88 has sufficient yield to permit the folding of the leg.

While certain exemplary embodiments of this invention have been described above and shown in the accompanying drawings, it is to be understood that such embodiments are merely illustrative of, and not restrictive on, the broad invention and that we do not desire to be limited in our invention to the specific constructions or arrangements shown and described, since various other obvious modifications may occur to persons having ordinary skill in the art.

What is claimed is:

1. A convertible passenger seat comprising a two-seat unit having an extensible seat bottom frame removably attachable to a pair of seat supports remaining in spaced relationship;

said seat bottom frame comprising an I-shaped central member and a pair of U-shaped end members, the legs of which are telescopically engageable with said central member;

fastening means on said end members at a first position thereon for fastening said end members to said seat supports in a first position; and fastening means on at least one of said end members at a second position thereon for fastening said one of said end members to one of said seat supports in a second position.

2. A convertible passenger seat as set forth in claim 1 wherein seat cushions extend across said seat bottom frame when said end members are fastened to said seat supports in said first position and segments of cushions are included when at least one of said end members is fastened in said second position.

3. A convertible passenger seat as set forth in claim 1 wherein said I-shaped central member includes laterally extending tubular members attached to the lower surface thereof.

4. A convertible passenger seat as set forth in claim 1 wherein said I-shaped central member includes an armrest.

5. A convertible passenger seat as set forth in claim 4 wherein said armrest has padded portions hingedly mounted along the top side edges thereof to permit their opening and folding down to an open position; said armrest having openings on the top surface thereof to receive table legs when inserted therein.

6. A convertible passenger seat as set forth in claim 4 wherein said armrest has openings on the top thereof; and a table with legs attached thereto, said openings being adapted to receive said legs to retain said table on said armrest.

7. A convertible passenger seat as set forth in claim 6 wherein said table has a top surface with raised edges therearound and laterally extending members with armrest pads thereon extending outwardly from said top surface.

8. A convertible passenger seat as set forth in claim 6 wherein said table has leg mounting brackets thereon with pins pivotally connecting said legs to said brackets.

* * * * *